Oct. 30, 1956  J. E. GAUT, JR., ET AL  2,768,444
INSTRUMENTS FOR USE IN MAKING PERSPECTIVE DRAWINGS
Filed Oct. 7, 1952  4 Sheets-Sheet 1

James E. Gaut, Jr.
Eloise C. Gaut
INVENTORS

BY *Attorneys*

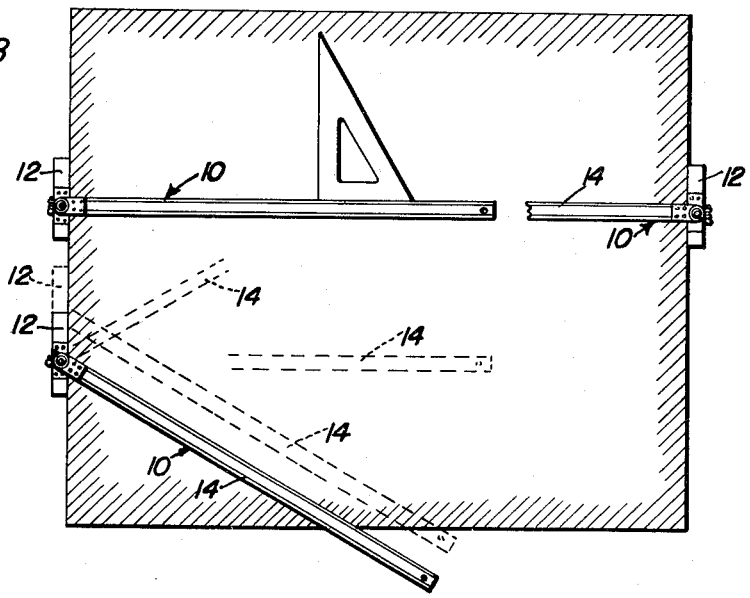
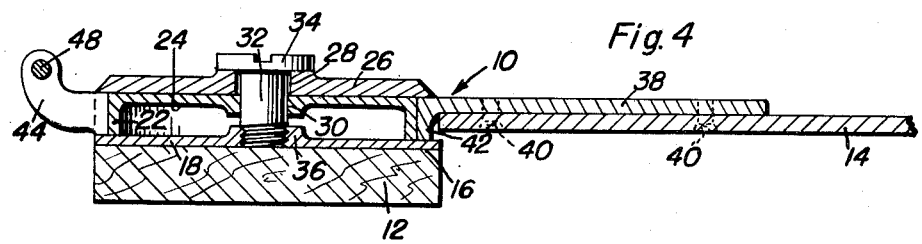
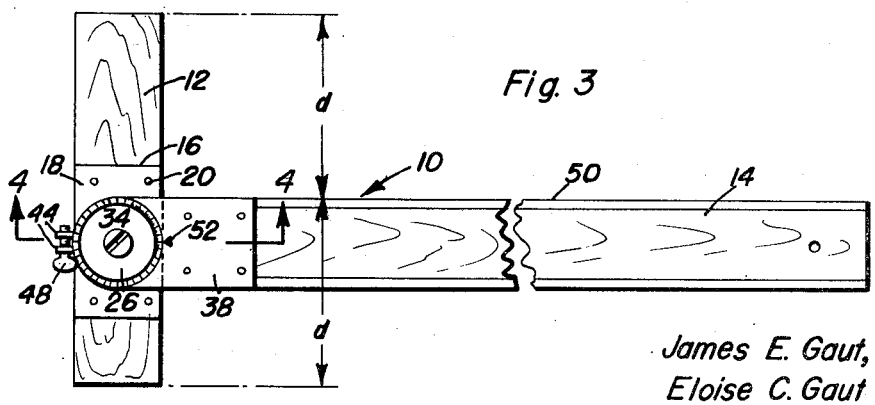

Oct. 30, 1956  J. E. GAUT, JR., ET AL  2,768,444
INSTRUMENTS FOR USE IN MAKING PERSPECTIVE DRAWINGS
Filed Oct. 7, 1952  4 Sheets-Sheet 3
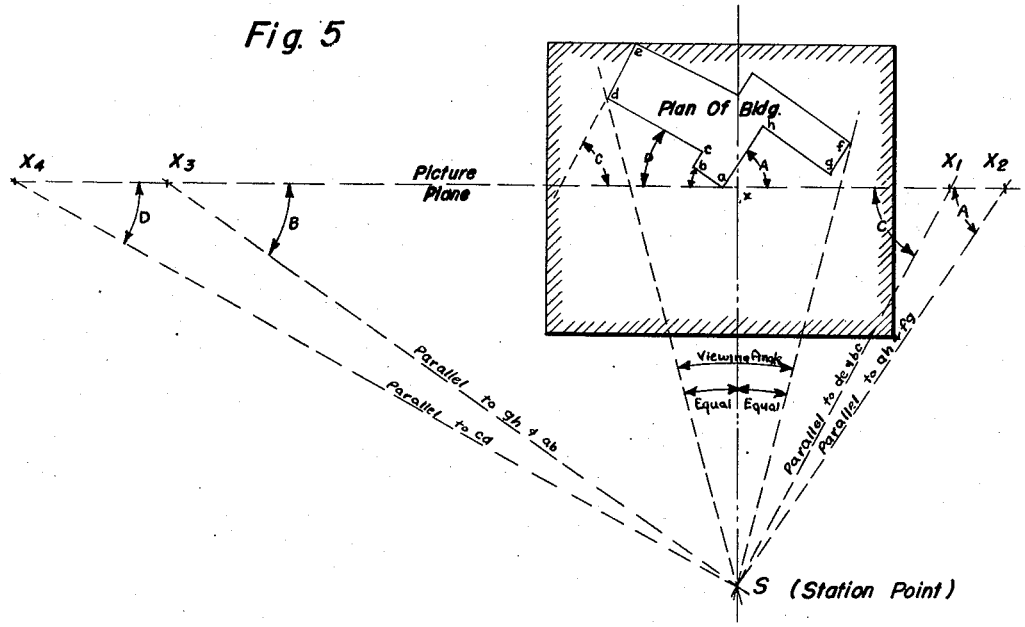
Fig. 5
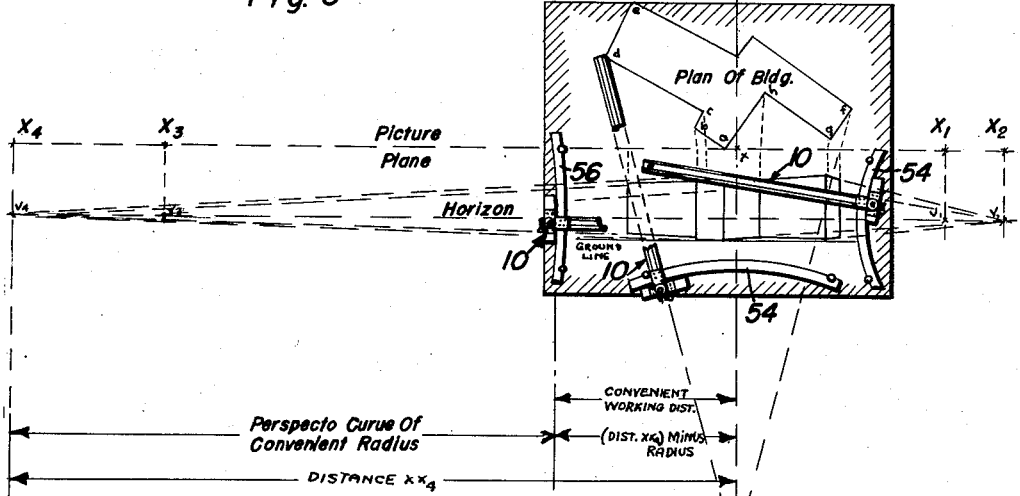
Fig. 6
Fig. 9
| Trigonometrical Method For Locating Points Which Do Not Occur On Table |
|---|
| $XX_1$ = cotan C(XS) or tan F(XS) |
| $XX_2$ =  "  A(XS)  "  "  E(XS) |
| $XX_3$ =  "  B(XS) or $\frac{XS}{\tan B}$ |
| $XX_4$ =  "  D(XS) etc. |
James E Gaut, Jr.
Eloise C. Gaut
INVENTORS
BY *Clarence A. O'Brien*
and *Harvey B. Jacobson*
Attorneys James E. Gaut, Jr.
Eloise C. Gaut
INVENTORS

United States Patent Office 2,768,444
Patented Oct. 30, 1956

2,768,444

INSTRUMENTS FOR USE IN MAKING PERSPECTIVE DRAWINGS

James E. Gaut, Jr., and Eloise C. Gaut, Houston, Tex., assignors of one-fourth to George R. Gaut, Houston, Tex.

Application October 7, 1952, Serial No. 313,442

3 Claims. (Cl. 33—77)

This invention relates to new and useful improvements in drafting instruments and the primary object of the present invention is to provide instruments particularly useful in making perspective drawings where the vanishing points of a plan view are located off the drafting board.

Another important object of the present invention is to provide drafting instruments for use in conveniently constructing perspective views and involving a novel and improved T-square useful in all types of drafting work and having relatively pivotally connected head and blade elements whereby inclined lines made at one edge of a drafting sheet may be accurately continued to and/or from another edge of the sheet.

A further object of the present invention is to provide a T-square of the aforementioned character wherein the head is pivotally connected to the blade and involving a protractor held stationary relative to the head and having graduations thereon which are selectively registerable with a pointer on the plane in order to indicate the included angle between the working edge of the blade and the head.

A still further aim of the present invention is to provide instruments for use in making perspective drawings which instruments are extremely simple and practical in construction, efficient and reliable in use, convenient to handle and install, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a fragmentary plan view of the T-square;

Figure 4 is an enlarged detail longitudinal vertical sectional view taken substantially on the plane of section line 4—4 of Figure 3;

Figure 5 is a diagrammatic view showing the method of locating the station point and vanishing points of a building plan;

Figure 6 is a diagrammatic view following in sequence the view shown in Figure 5 and illustrating the templates on the board and the T-squares in various positions it will occupy during the making of a perspective view of the plan view;

Figure 8 is a diagrammatic view showing the T-square in use for laying off lines on a drafting sheet from one edge of a board and from the opposite edge thereof;

Figure 9 is a chart showing the trigonometrical method of locating points of a perspective view which do not occur on the drafting board or table;

Figure 7:
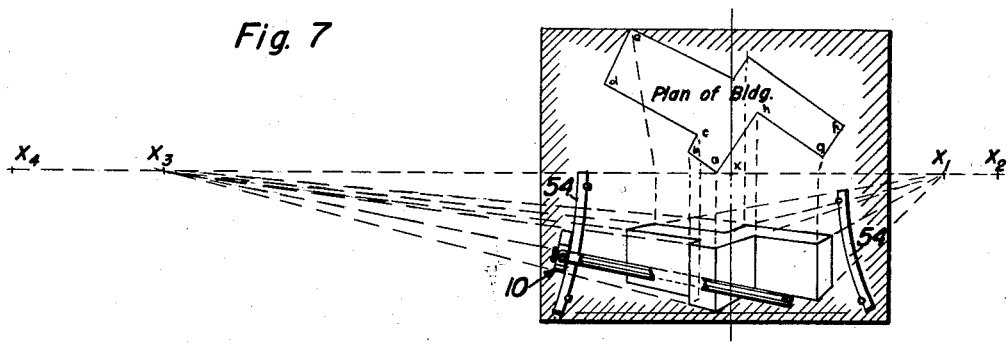
Figure 7 is a view somewhat similar to Figure 6 but showing the perspective view being produced at a different angle.
Figure 2:
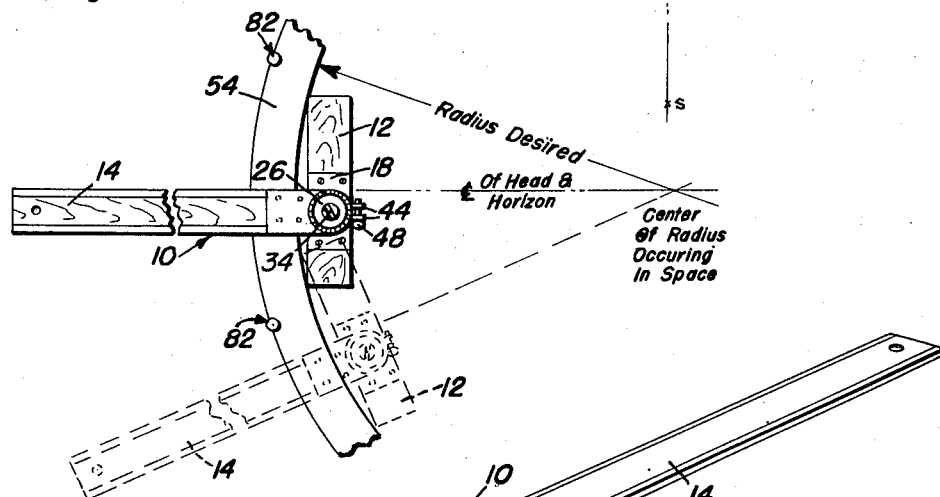
Figure 2 is a fragmentary plan view of the T-square in use with an arcuate template and showing the manner in which the template is established on a drafting board.
Figure 1:
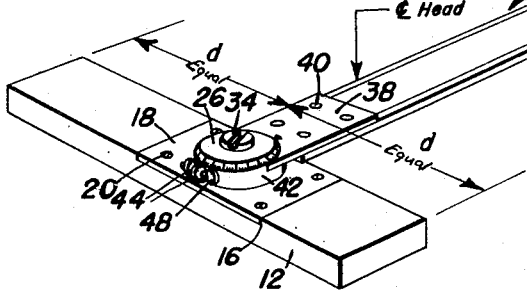
Figure 1 is a perspective view of the T-square forming an essential part of the present invention.

Referring now to the drawings in detail, wherein for the purpose of illustration, there is disclosed a preferred embodiment of the present invention, the numeral 10 represents the T-square generally including a substantially rectangular head or cross-member 12 and a straight edge or blade 14.

The upper face of the flat head 12 is notched, as at 16, to receive a rectangular strengthening plate or base plate 18 that is secured in notch 16 by fasteners 20. The depth of notch 16 is equal to the thickness of plate 18 so that the upper face of plate 18 will be flush with the upper face of head 12. The depending annular flange 22 of a circular plate or cap element 24 rests upon the upper face of plate 18 and the cap element forms a supporting platform for a graduated plate or protractor 26.

Protractor 26 and cap element 24 are formed with central, reinforced, registering apertures 28 and 30 that receive the shank 32 of a headed pin or fastener 34 whose head rests upon the protractor 26. The lower externally threaded extremity of shank 32 is receivably engaged within a threaded socket 36 formed in the plate 18.

A connecting plate 38 overlies one end of the plate 14 and is secured thereto by rivets or the like 40. A split band or clamp 42 is formed with the plate 38 and yieldingly engages the flange 22 while extending under the protractor 26 which peripherally overhangs the cap element 22. A pair of ears 44 project radially outwardly from the clamp 42 at the spaced ends thereof and these ears accommodate a screw 48 which is rotated to clamp or loosen the band 42 upon the flange 22 of cap element 24. By loosening screw 48 clamp 42 is rotatable on cap element 22 in order to adjust the angle of blade 14 with respect to head 12.

The blade 14 of the assembled T-square 10 as shown in Figure 3 is so pivotally attached to the head 12 that the perpendicular distance $d$ between the working edge 50 of the blade 14 and the ends of the head 12 are equal when the blade 14 is disposed perpendicular to the head 12 and T-square 10 can be used with left template 56 shown in Fig. 6. The blade 14 of the T-square may then be pivoted 180 degrees with reference to the head 12 and the T-square 10 can be used with right template 54.

Plate 38 is provided with an index or pointer 52 for registering with the radial degree graduations on the beveled edge of the protractor 26, whereby the included angle between the head and the blade may be readily observed for use in laying off angle lines on drafting sheets from one or more straight edges of a drafting table or board, as shown in Figure 8. A line may be placed on the sheet from the left edge of the table or board and then the T-square shifted or moved to the opposite or adjacent edge of the table or board in order to produce an accurate extension or continuation of the line.

Figure 10:
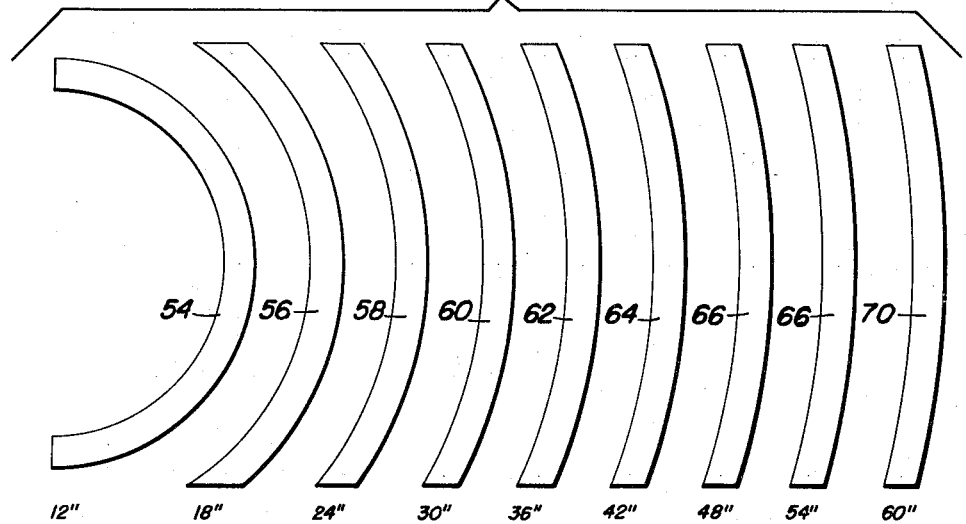
Figure 10 is a group plan view showing the various template strips which are selectively used with the T-square in making perspective views.
Figure 11:
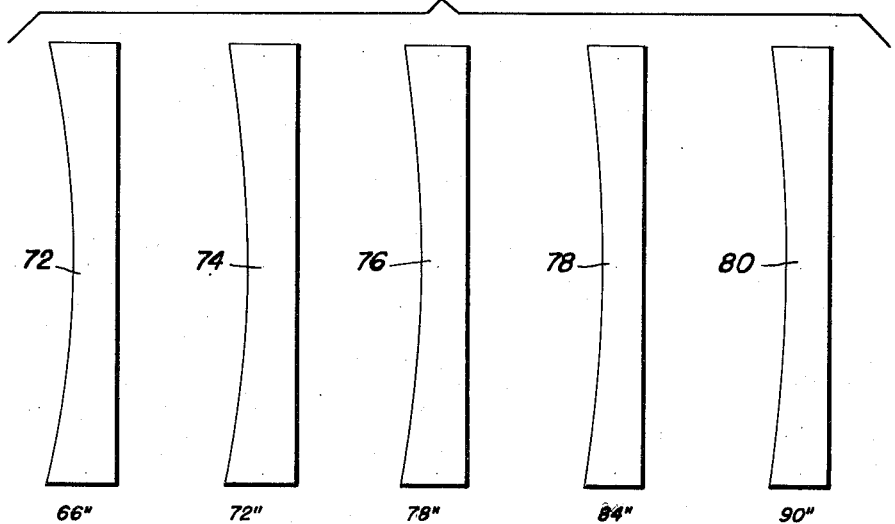
Figure 11 is a group plan view of the template strips in modified form, each of which includes a pair of concave working edges.

The templates or template strips used in conjunction with the T-square 10 in making perspective drawings are shown in Figures 10 and 11. These templates may be of any suitable material such as plastic and each template is provided with at least one concave working edge. The template strips 54, 56, 58, 60, 62, 64, 66, 68 and 70 of Figure 10 are of progressively increased radius and each includes a single concave working edge. The template strips 72, 74, 76, 78 and 80 of Figure 11 are also progressively increased in radius and each includes a concave working edge for the head of the T-square.

Figure 12:
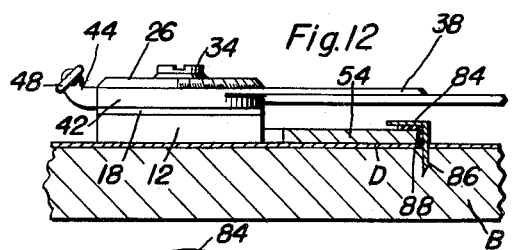
Figure 12 is a fragmentary vertical sectional view of a drafting table and template, showing the T-square engaged with the template and the holding means for the template (in section)
Figure 13:
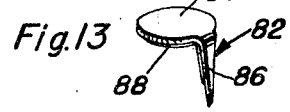
Figure 13 is a perspective view of the template holding means.

Means is provided for removably attaching the template strips onto a drafting table or board and over a drafting sheet. This means comprises a group of fasteners or tacks one of which is shown in Figure 13. Each tack 82 includes a circular head 84 whose peripheral edge is fixed to a pointed shank 86 that is disposed relatively perpendicular to the head 84. The relatively perpendicular flanges of a resilient angle element 88 are suitably secured, by glue or the like, to the lower face of head 84 and the inner face of the shank 86 to engage the upper surface and the convex edge of a template strip as shown in Figure 12 when the shank of the tack is extended through the drafting sheet D and into the table or board B.

Reference is now directed to Figures 5, 6 and 7 wherein there is illustrated one method of producing perspective views through the use of the heretofore described instruments. The plan of the building or object is drawn at a convenient scale on tracing paper and then located near the top of the drawing table in order to afford the maximum working space for the draftsman. The angle formed by the plan and the picture plane is an elective matter for the draftsman. It is usual for one corner of the plan to intersect the picture plane, and a line drawn from this point will be used for true heights of the object or building in the actual perspective drawing. However, the plan may be placed some distance behind the picture plane or in front of it as desired.

The station point S is determined. There are a variety of acceptable methods to locate the station point. Through point S rays parallel to the respective sides or planes of the object or building are projected to intersect the picture plane. The points which occur in space, or outside the limits of the drawing table require the aforedescribed instruments. With the distance of point S from the picture plane measured and known, and the angles of the object or building to the picture plane measured and known, then the vanishing points off the table can be determined by the use of trigonometric functions as shown in Figure 9.

Once the vanishing points in space to the right and to the left of line XS have been determined, it may be readily seen by scaling what portion of the total distance, such as XX1 or XX3, etc., is on the drafting table. The amount of the distance on the table is then subtracted from the over-all distance which gives the radius needed to place the square on the table, and also allowing for the placing of the curve in position, which depends on the degree of curvature.

The position of the horizon is optional with the draftsman. The curve must be placed so that the center will always originate along the line of the horizon, so that lines will vanish to the points chosen on the horizon. The curve is located in relation with the horizon by taking a curve and placing the head of the square 10 on it so that the working edge of the square will align or coincide with the horizon, and then anchoring the curve in this position on the table by the tacks 82. When using curves or template strips for lines originating at point S the strips are located similarly, except the working edge of the square 10 is aligned with line XS.

After sufficient controlling lines from station point S have been projected from the parts of the plan to the picture plane and then drawn perpendicular to the position of the horizon or perspective, then the actual perspective drawing is under way and may be readily completed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. For use in making perspective drawings, a series of arcuate strips each having a concave edge forming a working surface for the head of a T-square, at least two of said strips being selectively attached in spaced locations on a drafting board to supplement vanishing points located off the board, and a T-square including a head, said head being rectangular with two right angular corners contacting the concave edge of a selected strip and a blade pivotally secured to the head so that the T-square may be set to an angular position and freely interchanged from left to right hand positions of contact with said strips.

2. For use in making perspective drawings, a series of arcuate strips each having a concave edge forming a working surface for the head of a T-square, said strips being selectively attached to a drafting board in spaced positions thereon to supplement vanishing points located off the board, a T-square including a head provided with two right angular corners contacting the concave edge of a selected strip and a blade pivotally secured to the head, so that said T-square may be set to a selected angle and freely interchanged from left to right hand positions in contact with said strips, said head being elongated with ends, said blade having a longitudinal working edge, and said blade positioned on the head so that said working edge is equidistant from said ends of the T-square head.

3. The subject matter of claim 2 wherein there are fastening means contacting portions of said strips near the edges thereof for securing said strips to the drafting board.

References Cited in the file of this patent

UNITED STATES PATENTS

| | | |
|---|---|---|
| 15,359 | Von Kammerhuuber | July 15, 1856 |
| 346,836 | Almorth | Aug. 3, 1886 |
| 453,332 | Wright | June 2, 1891 |
| 798,717 | Weatherly | Sept. 5, 1905 |
| 798,721 | Wilson | Sept. 5, 1905 |
| 1,338,988 | Kinoshita | Mar. 4, 1920 |
| 1,409,343 | Karasick | Mar. 14, 1922 |
| 1,599,776 | Lazarevich | Sept. 14, 1926 |
| 1,678,473 | Karst | July 24, 1928 |
| 1,969,758 | McCoy | Aug. 14, 1934 |
| 2,458,114 | Storch | Jan. 4, 1949 |
| 2,545,112 | Sheridan | Mar. 13, 1951 |
| 2,611,185 | Thursack | Sept. 23, 1952 |

FOREIGN PATENTS

| | | |
|---|---|---|
| 74,635 | Switzerland | Mar. 16, 1917 |